United States Patent [19]
Chancellor et al.

[11] Patent Number: 5,944,999
[45] Date of Patent: Aug. 31, 1999

[54] MODULAR FILTRATION SYSTEM

[75] Inventors: Dennis H. Chancellor, Camarillo; Mark Chancellor, Thousand Oaks; Jacquetta M. Vogel, Camarillo, all of Calif.

[73] Assignee: Nate International, Woodland Hills, Calif.

[21] Appl. No.: 08/919,293

[22] Filed: Aug. 28, 1997

Related U.S. Application Data

[63] Continuation of application No. 08/708,249, Sep. 3, 1996, abandoned, which is a continuation of application No. 08/834,916, Apr. 7, 1997, which is a continuation of application No. 08/722,868, Sep. 26, 1996, abandoned

[60] Provisional application No. 60/033,343, Nov. 21, 1996, provisional application No. 60/032,863, Nov. 21, 1996, provisional application No. 60/033,342, Nov. 21, 1996, provisional application No. 60/036,739, Jan. 27, 1997, provisional application No. 60/036,740, Jan. 27, 1997, provisional application No. 60/043,001, Apr. 14, 1997, provisional application No. 60/044,189, Apr. 25, 1997, provisional application No. 60/051,192, Jun. 30, 1997, and provisional application No. 60/051,223, Jun. 30, 1997.

[51] Int. Cl.⁶ ................................................ B01D 61/00
[52] U.S. Cl. ...................... 210/650; 210/652; 210/170; 210/232; 210/321.78
[58] Field of Search ..................... 210/170, 652, 210/651, 321.78, 321.9, 257.2, 232, 650; 417/108; 166/311

[56] References Cited

U.S. PATENT DOCUMENTS

| | | | |
|---|---|---|---|
| 4,040,486 | 8/1977 | Kirkland, Jr. | 166/311 |
| 4,125,463 | 11/1978 | Chenoweth | 210/170 |
| 4,135,364 | 1/1979 | Busick | 417/108 |
| 4,352,736 | 10/1982 | Ukai et al. | 210/321.78 |
| 5,470,469 | 11/1995 | Eckman | 210/321.8 |

*Primary Examiner*—Ana Fortuna
*Attorney, Agent, or Firm*—Crockett & Fish

[57] ABSTRACT

The weight of a fluid is used to drive a plurality of semi-permeable membranes or other filter material to produce a permeate, and in at least some level of the apparatus more than 30% of the permeate produced is collected within a single filter casing. In other aspects, the filter material is at least partially contained within series production modules, which may contain transport zones for transporting feed or flushing fluid. In other aspects the ends of adjacent production modules may be designed to mate with one another using a slip fit, and the production modules may be maintained in mating relationship through connections to supporting cables or rods. In still other aspects of the inventive subject matter a submerged pump may be used to raise permeate towards the surface, and the pump may advantageously operate at least partially using centrifugal and/or air lift principles. In still other aspects feed fluid can be provided from a salty or brackish water source such as an ocean or bay using pipes having removable inlet plugs which resist clogging, and it is contemplated that such pipes can be laid using an underwater sled which digs a trench while concurrently laying the pipe.

19 Claims, 12 Drawing Sheets

MODULAR FILTRATION SYSTEM

This application claims the benefit of and is a continuation of U.S. applications Ser. 08/708,249, filed Sept. 3, 1996, abandoned; which is a continuation of Ser. No. 08/834,916, filed Apr. 7, 1997, pending; which is a continuation of Ser. No. 08/722,868, filed Sept. 26, 1996, abandoned; Provisional applications 60/033,343, filed Nov. 21, 1966, pending; 60/032,863, filed Nov. 21, 1996, pending; 60/033,342, filed Nov. 21, expired; 60/036,739, filed Jan. 27, 1997, expired; 60/036,740, filed Jan. 27, 1997, pending; 60/043,001, filed Apr. 14, 1997, pending; 60/044,189, filed Apr. 25, 1997, pending; 60/051,192, filed Jun. 30, 1997, pending; and 60/051,223, filed Jun. 30, 1997, pending.

FIELD OF THE INVENTION

The present invention relates generally to filtration of fluids, including especially filtration of water.

BACKGROUND OF THE INVENTION

Despite numerous advances over the years, there still exists a continuing need for water purification. Many areas of the world have insufficient fresh water for drinking or agricultural uses, and in other areas where plentiful supplies of fresh water exist, the water is often polluted with chemical or biological contaminants, metal ions and the like. There is also a continuing need for commercial purification of other fluids such as industrial chemicals and food juices. U.S. Pat. No. 4,759,850, for example, discusses the use of reverse osmosis for removing alcohol's from hydrocarbons in the additional presence of ethers, and U.S. Pat. No. 4,959,237 discusses the use of reverse osmosis for orange juice.

Many of these needs have been addressed by filtration, and in particular by reverse osmosis, in which constituents are separated under pressure using a semi-permeable membrane. As used herein, the term membrane refers to a functional filtering unit, and may include one or more semi-permeable layers and one or more support layers. Depending on the fineness of the membrane employed, reverse osmosis can remove particles varying in size from the macro-molecular to the microscopic, and modern reverse osmosis units are capable of removing particles, bacteria, spores, viruses and even ions such as $Cl^-$ or $Ca^{++}$.

There are several problems associated with large scale reverse osmosis (RO), including excessive fouling of the membranes and high costs associated with producing the required pressure across the membranes. These two problems are interrelated in that most or all of the known RO units require flushing of the membranes during operation with a relatively large amount of feed liquid relative to the amount of permeate produced. The ratio of flushing liquid reject to permeate recovery in sea water desalination, for example, is about 3:2. Because only some of the sea water being utilized is recovered as purified water, energy used to remaining water is wasted, creating an inherent inefficiency.

There have been numerous attempts over the years to improve the efficiency and concomitant cost effectiveness of RO units. U.S. Pat. No. 5,229,005 to Fok et al, for example, describes lowering a vessel from the side of boat deep into the ocean. The vessel is equipped with an RO membrane on one of its surfaces, and at a depth of about 700 meters, the pressure at depth is sufficient to force fresh water through the membrane and into the vessel. When the vessel is thus filled with fresh water, it is raised back to the ship and emptied. To increase operating efficiency, the inventor suggests alternately lowering and emptying two such vessels. While the claimed method can be functional, the non-continuous nature of the process renders it largely inadequate to supply fresh water on a commercial scale.

Another attempt at improving the cost effectiveness of RO units is discussed in U.S. Pat. No. 4,512,886 to Hicks et al. There, an RO module is placed in the ocean at a depth at which the ambient pressure is insufficient to operate the membrane, but at which the depth pressure combined with additional pressure provided by a pump is sufficient to operate the membrane. Pressurized water is therefore pumped through the RO module utilizing energy from waves overhead, with fresh water coming out one end of the module, and brine being eliminated from the other end. Unfortunately, the mechanism is limited to localities having considerable wave action, and in any event is relatively costly to install and operate.

Still another attempt at improving the cost effectiveness of RO units is discussed in U.S. Pat. No. 3,456,802 to Cole et al. In that patent, several RO cells are submerged at a sufficient depth in the ocean, and pre-filtered salt water is filtered at the surface and fed down to the cells through a pipe. Fresh water output of the cells is then pumped back up to the surface, while the flush water is returned to the ocean. By this mechanism Cole et al. claims to increase membrane life by pre-filtering the salt water applied against the membranes, and by increasing the flushing rate. What was not overcome, however, was the requirement of proximity to a deep body of salt water, and the difficulty in replacing the RO cells.

The requirement of proximity to a deep body of salt water in desalinization operations is addressed in U.S. Pat. No. 4,125,463 to Chenoweth, which is incorporated by reference herein in its entirety. In Chenoweth, numerous semi-permeable membrane assemblies are placed inside a well or other subterranean cavity. Salt water flows down to the membranes from above, and the hydrostatic pressure of the salt water drives a permeate through the membranes. The permeate, which in this case is purified water, is then pumped out of the system through a riser. The main advantage contemplated by Chenoweth is that energy expenditures are largely restricted to pumping the purified water.

Despite the reduced energy expenditures contemplated by Chenoweth, the design is impractical. Among other things, the Chenoweth design teaches a central riser surrounded at many different depths by clusters of five satellite RO units. Each of the satellite units has its own collector, and the various collectors of each cluster flow together at a manifold into the central riser. Such a design is inherently inefficient. Clustering of satellite RO units adds unnecessary complexity and expense, and the presence of multiple satellite casings on the same level wastes precious channel volume.

Thus, there still exists a need for apparatus and methods to cost effectively purify large quantities of fluid using pressurized filtration.

SUMMARY OF THE INVENTION

In the present invention apparatus and methods are provided in which the head pressure developed by the weight of a fluid is used to drive a plurality of filters to produce a permeate, and in at least some level (i.e. at some depth) within the apparatus at least 30% of the permeate produced is collected within a single filter casing. The inventive subject matter can thereby reduce or eliminate clustering in channel-based and other filtration systems, and thus provide for improved efficiency and cost effectiveness.

In preferred embodiments substantially all of the filter material at a given depth is wrapped about one or more permeate collectors within a single filter casing. In still more preferred embodiments the filters and lengths of collector tube(s) form the inner cores of a series of production modules. In especially preferred embodiments each of the production modules further includes a transport zone for transporting brine and a transport zone for transporting permeate.

In other aspects the ends of adjacent production modules may be designed to mate with one another using a slip fit joint, and the production modules may be maintained in mating relationship through connections to supporting cables or rods.

In still other aspects of the inventive subject matter a submerged pump may be used to raise permeate towards the surface. In preferred embodiments having this feature, the pump can operate at least using centrifugal and/or air lift principles, and where an air lift principle is used an energy recovery system can be employed to recover energy from the rising fluid and gas. It is also contemplated to employ a gas produced via electrolysis to assist in the pumping.

In still other aspects feed fluid can be provided from a salty or brackish water source such as an ocean or bay using pipes having removable inlet plugs which resist clogging. It is also contemplated that such pipes can be laid using an underwater sled which digs a trench while concurrently laying the pipe.

BRIEF DESCRIPTION OF THE DRAWINGS

Various objects, features, aspects and advantages of the present invention will become more apparent from the following detailed description of preferred embodiments, in conjunction with the accompanying drawings, wherein like numerals represent like components.

DETAILED DESCRIPTION

Figure 1:
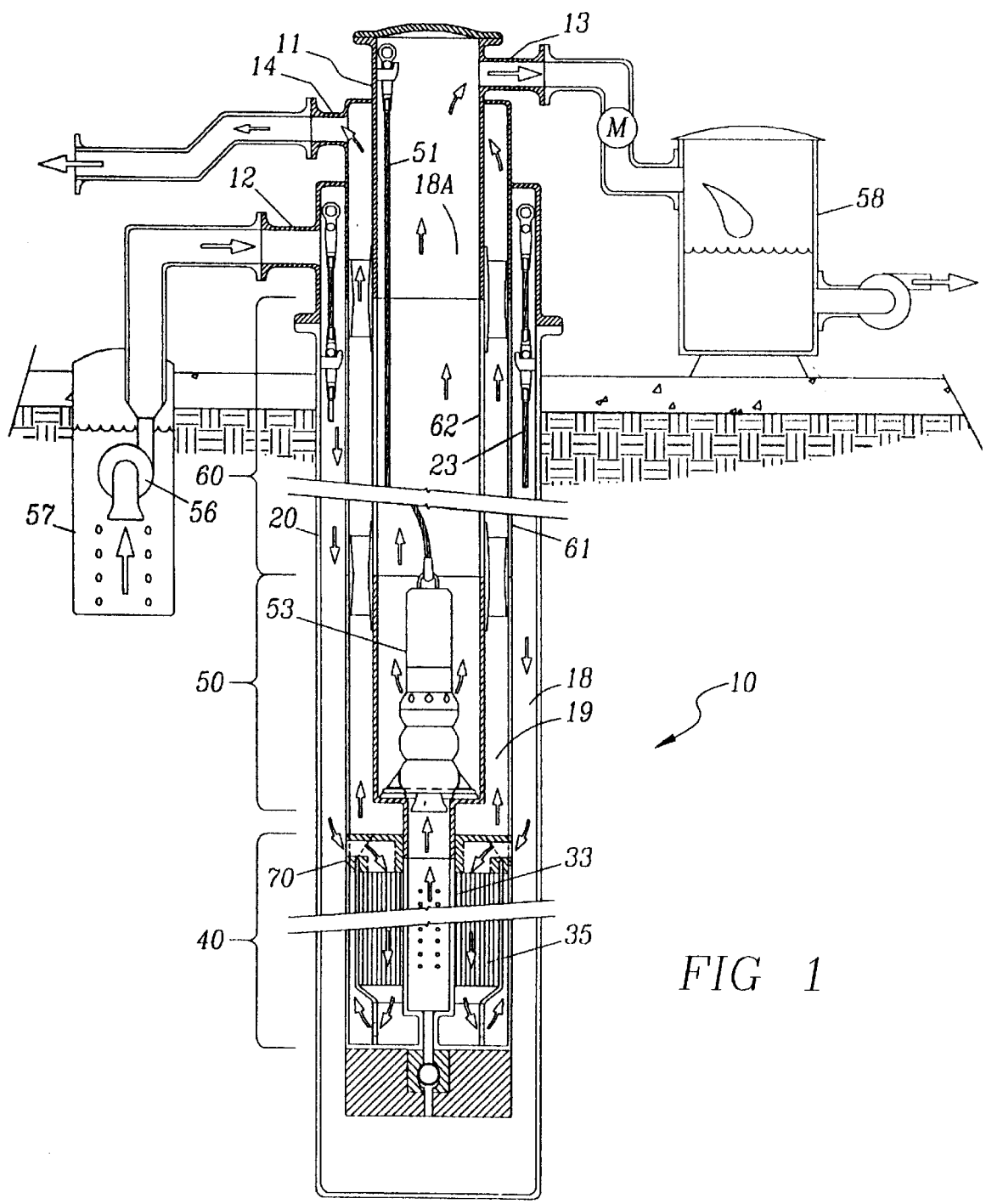
FIG. 1 is a schematic of a reverse osmosis system.

In FIG. 1 a filtration system 10 generally comprises a headworks 11, a plurality of transition modules 60, a pump module 50, a plurality of production modules 40, and cables 23 which support the various modules. The headworks 11 and various modules 60, 50, 40 all cooperate to provide a feed liquid flowpath 18, a permeate flowpath 18A and a flushing liquid flowpath 19.

The various modules of system 10 may be contained in a well or other channel (not shown), or may be situated in an open ocean or other body of water (not shown). In the case of a well or other channel, one of the flowpaths 18, 18A or 19 can advantageously be formed as an annular space between the outer casings of the modules 60, 50, 40 and the lining 20 of the channel. Where the system 10 is disposed within an ocean or other open body of liquid, the feed liquid and flushing liquid flowpaths, 18 and 19, respectively, can comprise the open body of liquid.

As used herein, the term "channel" is used generically to mean a space having a relatively deep and relatively narrow portion which can contain a fluid. Thus, an ocean, bay, lake or other large body of water cannot be considered a channel as the term is used herein because such bodies are broad relative to their depth. On the other hand, a water or oil well, or an underground chamber connected via a passageway would all be considered channels as the term is used herein. It is desirable for the channel to have a usable inner diameter of at least 6 inches, although channels having smaller diameters can also be used. The lining of the channel is not especially important, and suitable channels may have the conventional steel, cast iron, concrete or other casings, or they may have no casing at all. In many instances a channel employed according to the present invention may be located near the ocean or other salty or brackish body of water to provide a convenient source of water. In such cases the channel can descend from a point in the body of water or from a point on the land. In other instances an appropriate channel may be utilized which is many kilometers from a source of water. Appropriate channels may even be inclined rather than vertically oriented. In short, apparatus and methods as described herein may be utilized in conjunction with many different types of channels, regardless of their original purpose, shape, orientation, and location.

At headworks 11 a feed liquid, which may, for example, comprise salt water or brine, is fed into the system 10 via feed liquid supply 12, while waste liquid is expelled at flushing liquid discharge 14, and purified liquid (permeate) is expelled at permeate discharge 13. Feed liquid supply 12, permeate discharge 13 and flushing liquid discharge 14 may be welded or otherwise secured to head works 11. In particularly preferred embodiments, the system 10 can be pressurized to approximately 3 bars by feed liquid pump 56. This helps overcome friction losses in feed liquid flowpath 18, head losses through the production assemblies 40, and friction losses in flushing liquid flowpath 19.

A pre-filtration system 57 may optionally be employed as appropriate, depending on the particulate concentration in the feed liquid. A receiving tank 58 may also be utilized to receive permeate.

Transition modules 60 are primarily designed to provide conduits between the headworks 11 and the pump module 50. Transition modules 60 can therefore be quite simple in design, such as a pipe within a pipe (not shown), or one or more collector tubes disposed in a side-by-side configuration (not shown).

Pump module 50 generally comprises a centrifugal or other pump 53 which raises permeate from the production modules 40 the headworks 11. Pump 53 is most likely operated electrically, and electrical energy can be brought to the pump using a power cable (not shown). Alternative pumps may operate using some other force, such as compressed air, and it is particularly contemplated that pump 53 may comprise an air lift pump or some composite pump which utilizes an air lift principle. In such circumstances the gas employed could be compressed at the surface and transported to the pump using a high pressure gas line, or at least some of the gas could be produced at or near the pump through electrolysis. In other embodiments, the system 10 may include multiple pump modules (not shown), or a single pump module may contain more than one pump. It is advantageous to provide a means of raising and lowering pump 53 without dismantling the transition modules 60, and this may be accomplished using pump installation cables 51.

It is contemplated that pump 53 may be employed to reduce net positive suction to about one bar, and to discharge permeate into permeate flowpath 18A at between 60 and 70 bars. The actual discharge pressure is at least partially a function of the depth below the surface at which pump 53 is mounted and the salinity of the feed liquid.

Production modules 40 generally comprise an intake subassembly 70 and a plurality of adjacent filtering subassemblies 30. The intake subassembly 70 directs feed liquid from the feed liquid flowpath 18 into the uppermost or lowermost filtering subassembly 30, and directs flushing liquid away from the filters 35 contained within the filtering subassemblies 30. As described below in greater detail with respect to FIG. 2, the filtering subassembly 30 contains one or more filters 35 which separate feed liquid into permeate and flushing liquid.

It is contemplated that production modules can be placed at depths of at least about 50meters. Such a depth is sufficient to perform reverse osmosis on brackish water using currently available membranes, and it is expected that as membrane technology improves, production modules will perform well at depths of less than 50 meters. On the other hand, it is contemplated that systems will employ filters at a great range of depths, including depths of at least 100 meters, at least 250 meters, at least 350 meters, at least 500 meters, at least 750 meters, and at least 1000 meters.

Cables 23 are employed to hold the various modules 60, 50, 40 together, and to support their weight. As described below in greater detail with respect to FIG. 5, cables 23 can be replaced with bars (not shown), rods (not shown), straps (not shown), or other supports, and alternatively can be eliminated altogether by employing other supporting and connecting means between adjacent modules.

Modules 60, 50 and 40 may be constructed in virtually any workable sizes and shapes, using virtually any suitable materials, and not all of the modules need have the same structural or compositional characteristics. For convenience and cost effectiveness it is contemplated that and transition modules 60, permeate pump assembly 50, and production modules 40, will be substantially tubular, and will be constructed primarily of suitable materials. In particular, construction materials such as PVC, epoxy fiberglass, stainless or other steels may be used. Still other construction materials may include new composites or materials not yet developed.

In operation, production modules 40 would generally be joined or otherwise juxtaposed end to end with other production modules 40 to form a chain. One or more pump modules 50 would be placed on top of the uppermost production module, and transition modules 60 would be added above the pump module(s) to reach the headworks 11. The assemblies would be lowered into an open area or channel to the required depth using an apparatus such as that depicted in FIGS. 6 or 7.

The various modules are preferably coupled using slip fit couplings. In alternative embodiments, however, two or more of the modules may be coupled by other means, including threaded connections, clamps, bolts, and glues.

It is also contemplated that systems according to the inventive subject matter may be associated with some sort of support facility, which may include one or more buildings, pump houses and so forth. While not explicitly shown, it is anticipated that the feed fluid may be pre-filtered, and such pre-filtering may occur at any point upstream of the feed liquid supply 12 passing into the production assemblies 40. The ability to pre-filter salt water extracted from a body of water such as a bay or ocean may be relatively important in terms of long-term protection of the filter material, and may render apparatus and methods according to the present subject superior to that of merely placing the filters in the open ocean, and either relying upon the natural water currents or pumping water past the filters to achieve adequate flushing.

Figure 2:
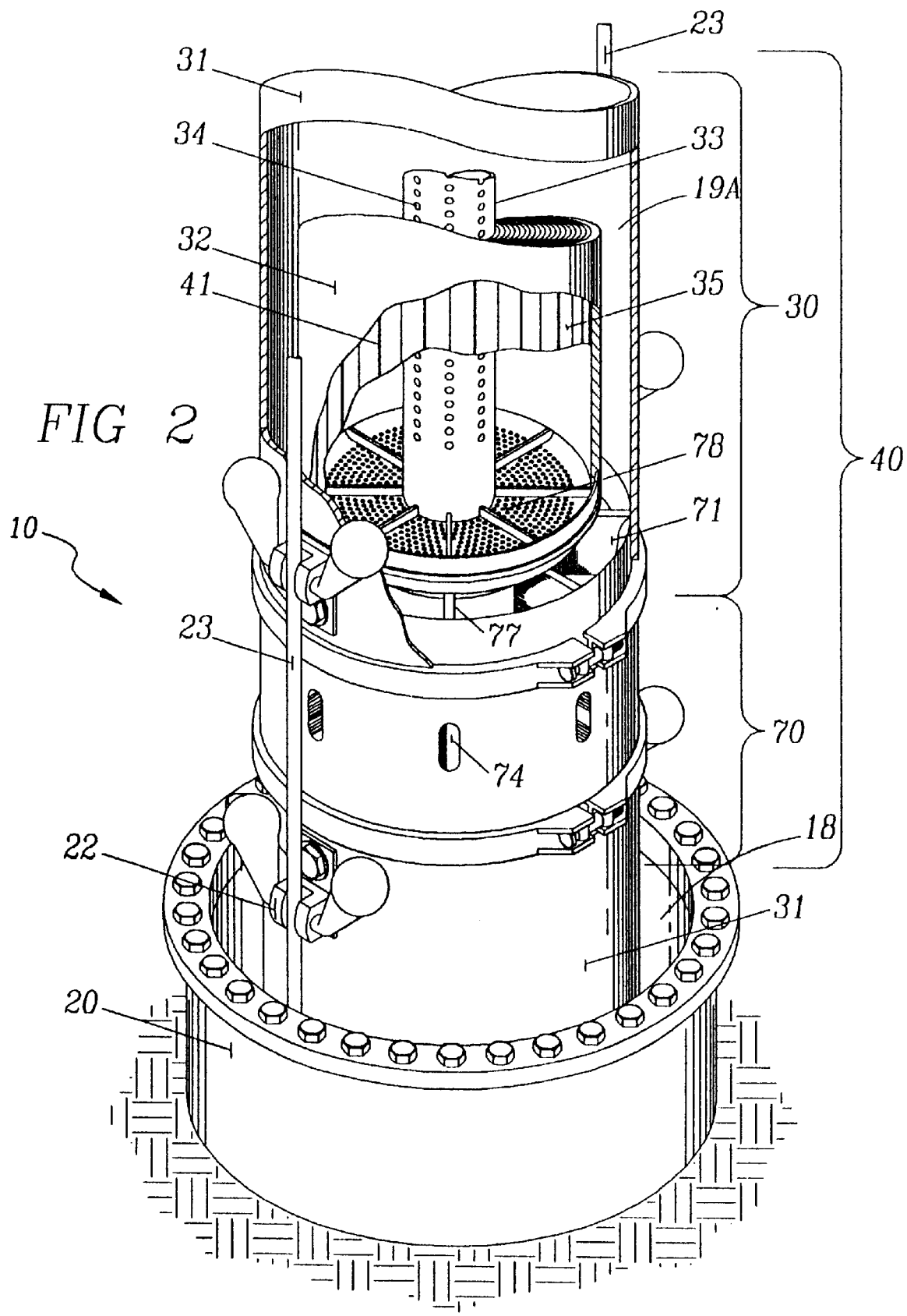
FIG. 2 is a schematic of a production module.

Turning to FIG. 2, a production module 40 generally comprises one or more filter subassemblies 30 and a single transition subassembly 70. Each filter subassembly 30 comprises an outer shell 31, an annular space 19A, and one or more filter subassemblies 44. As best seen in FIGS. 8A–8E, each filter subassembly 44 may advantageously comprise one or more filter casings 32, each of which may house a plurality of filter leaves 35 and spacers 41 coupled to a collector tube 33.

As further described below, FIG. 2 shows a plurality of intake holes ports 74 in intake subassembly 70 contains which communicate fluid from feed liquid flowpath 18 through spokes 77, and into filter feed area 78.

FIG. 2 also details a possible coupling 22 between cable 23 and production module 40. The coupling can take place at any point or points along the production modules 40, but it is preferred that such coupling will take place near the top and near the bottom of production assemblies 40.

There are many alternative configurations of production modules, which, though not shown in the present drawings, are consistent with the inventive concepts herein. For example, it is not necessary for the fluid transport annulus in the production modules 40 to be annular, and it is not even necessary for the production modules 40 to include a fluid transport zone. As discussed below, the feed liquid can be transported in a space between the production modules and the channel lining, and it would also be possible to transport feed liquid or permeate in a separate pipe or compartment external to the production modules. Similarly, in alternative embodiments the filter leaves 35, spacers 41 and collector tube(s) may be disposed differently from that shown here.

Figure 3:
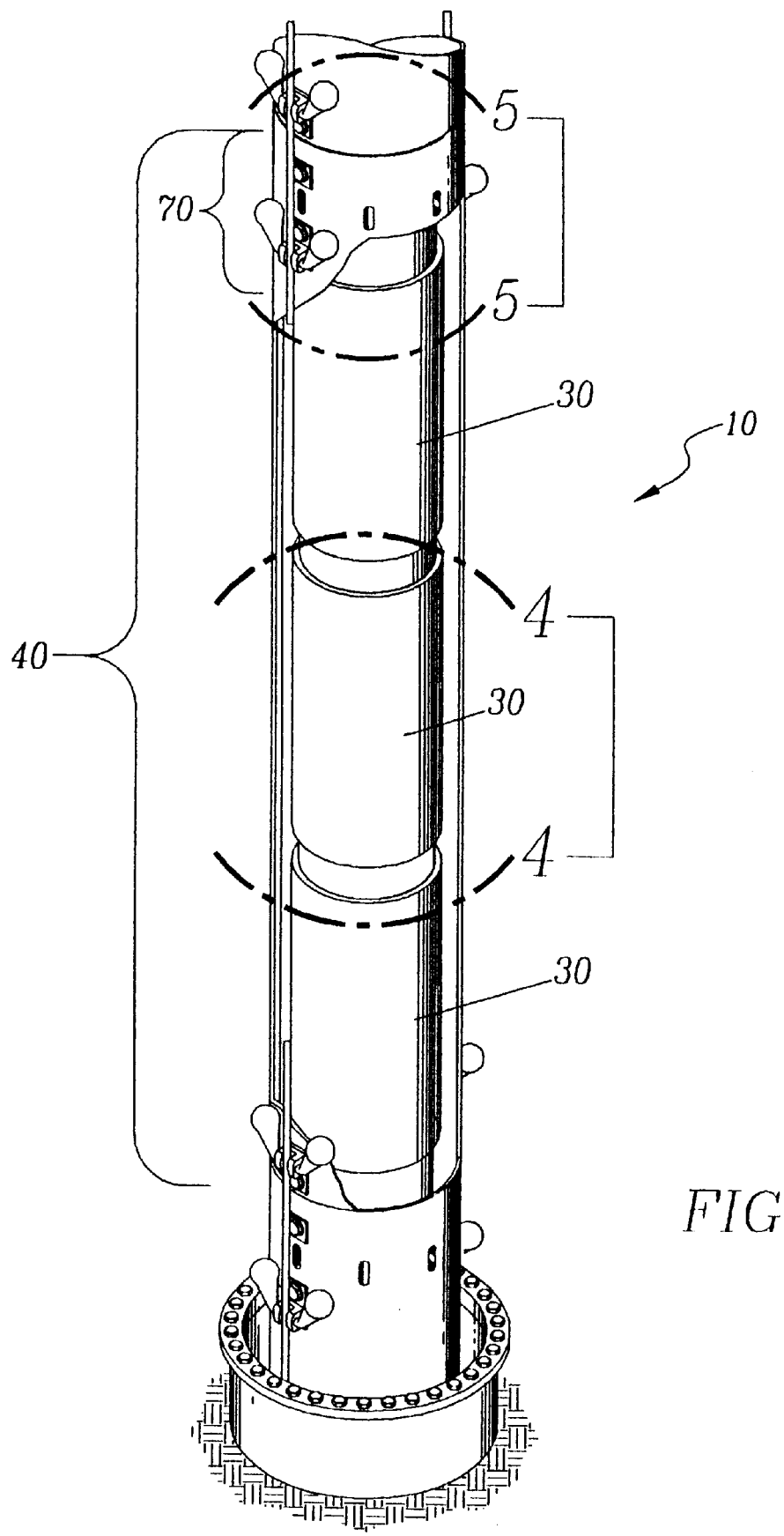
FIG. 3 is a perspective schematic of a production module.

In FIG. 3 a preferred arrangement includes three filter subassemblies 30 bracketed by single transition subassemblies 70. It should, however, be appreciated that a greater or lesser number of filter subassemblies 30 could be located between transition subassemblies 70, and it is particularly contemplated that a filtering system utilized in desalinization of salt water would have five series mounted filter subassemblies 30 located between transition subassemblies 70, each filter subassembly 30 being approximately six meters long. The number five is contemplated to be particularly advantageous because it is thought to properly balance flux (flush) rate against pressure drop and recovery rate.

Figure 4:
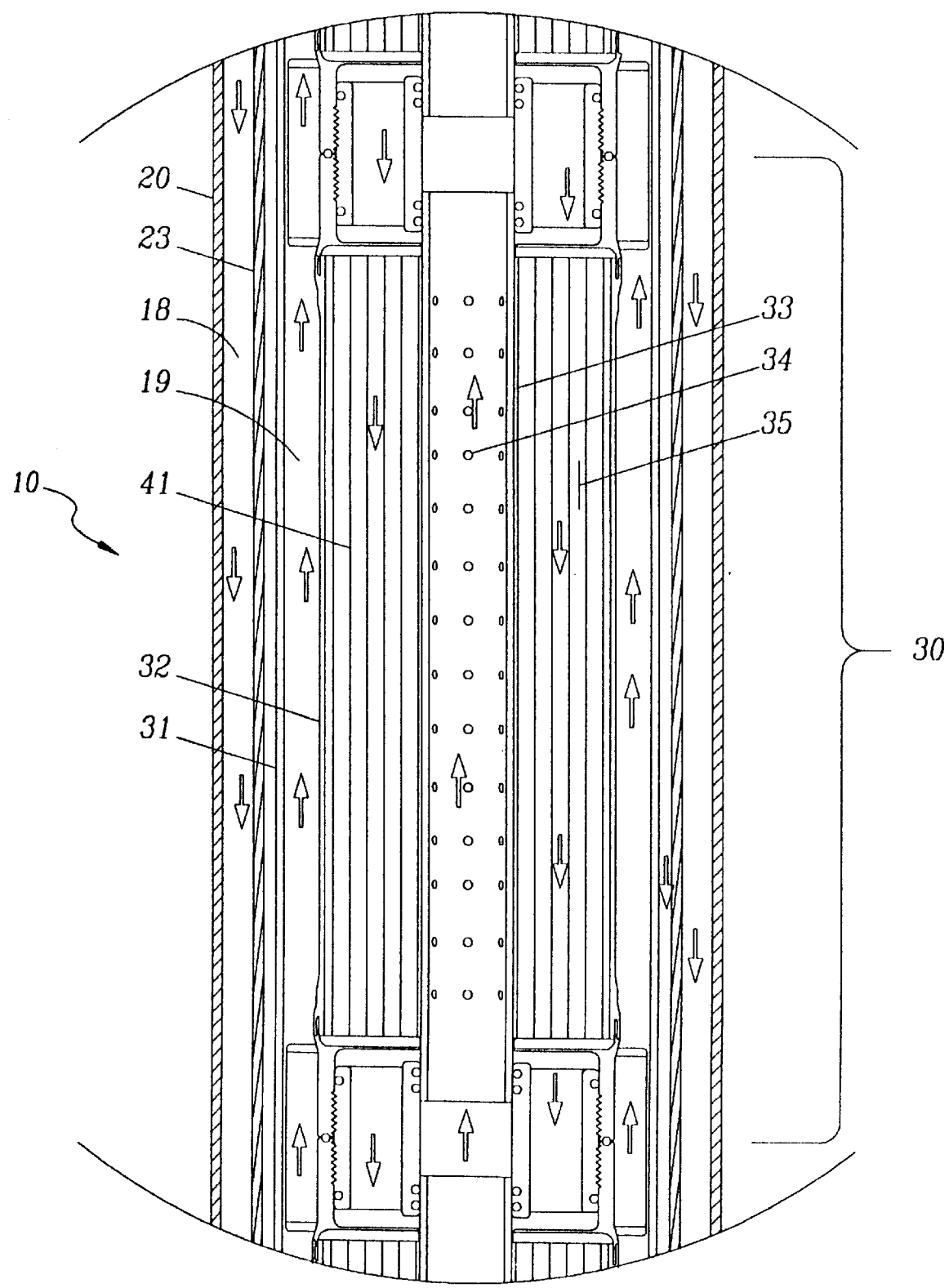
FIG. 4 is a vertical cross-section of the production module of FIG. 3 at 4—4.
Figure 5:
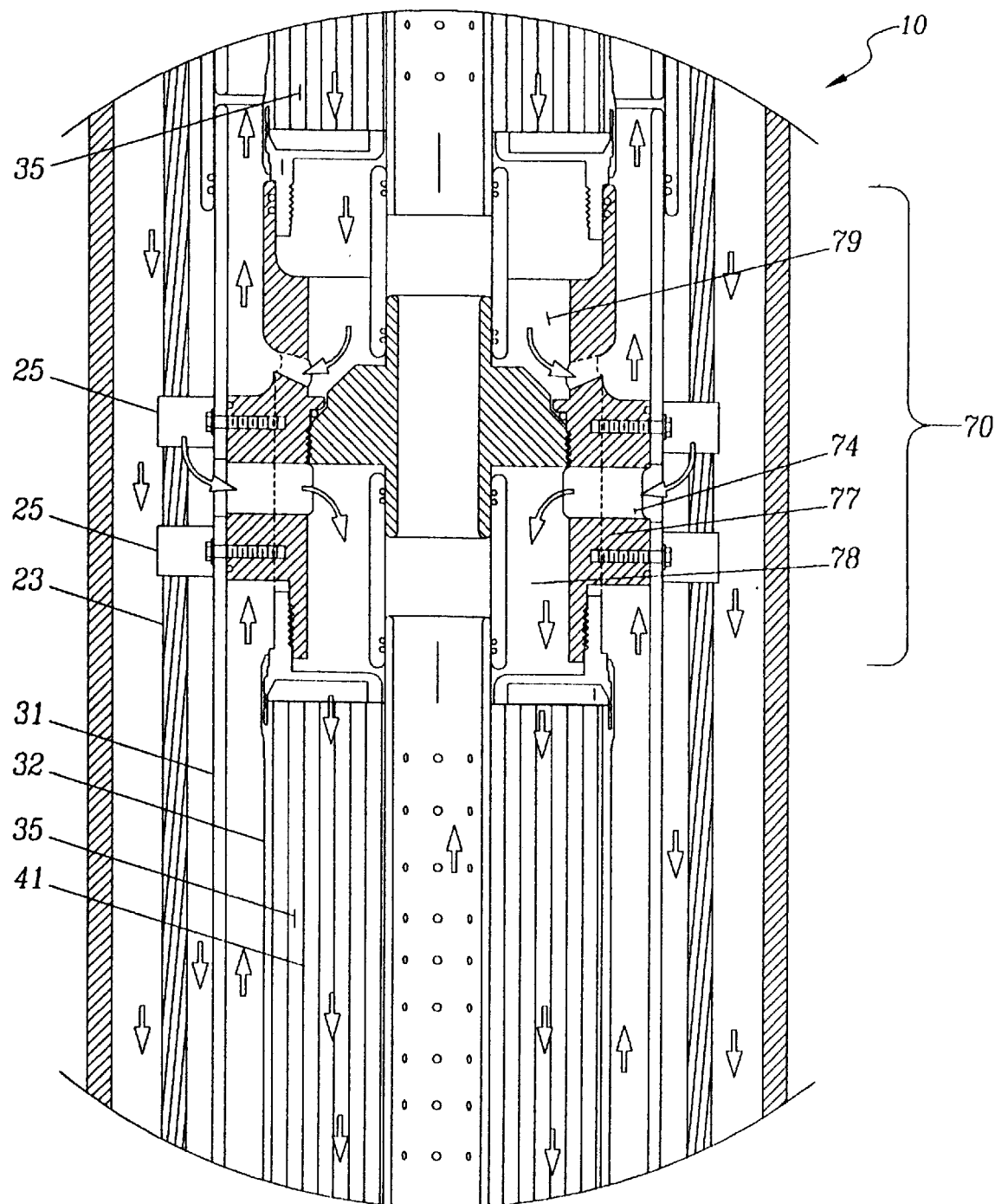
FIG. 5 is a vertical cross-section of the production module of FIG. 3 at 5—5

In FIGS. 4 and 5 arrows are used to indicate possible flow directions of feed liquid. In the particular embodiment show, feed liquid flows downward along flowpath 18, through intake ports 74, along spokes 77, and into filter feed area 78. The feed liquid then flows downward through spacers 41 (see FIG. 8C), where it is divided by the filter material 45 into separate streams of permeate and flushing liquids. Permeate then passes through collector holes 34 and into collector tube 33, from which it flows upwards toward permeate pump 53. At the same time, the flushing liquid continues to flow downwards through the spacers 41 of one or more filter subassemblies 44, until it reaches collection space 79 located within the next lower transition subassembly 70. The flushing liquid then leaves the transition subassembly 70 and passes upward through successive overhead production modules 40, pump module 50 (not shown), and transition modules 60 (not shown) into the headworks (not shown).

Figure 6:
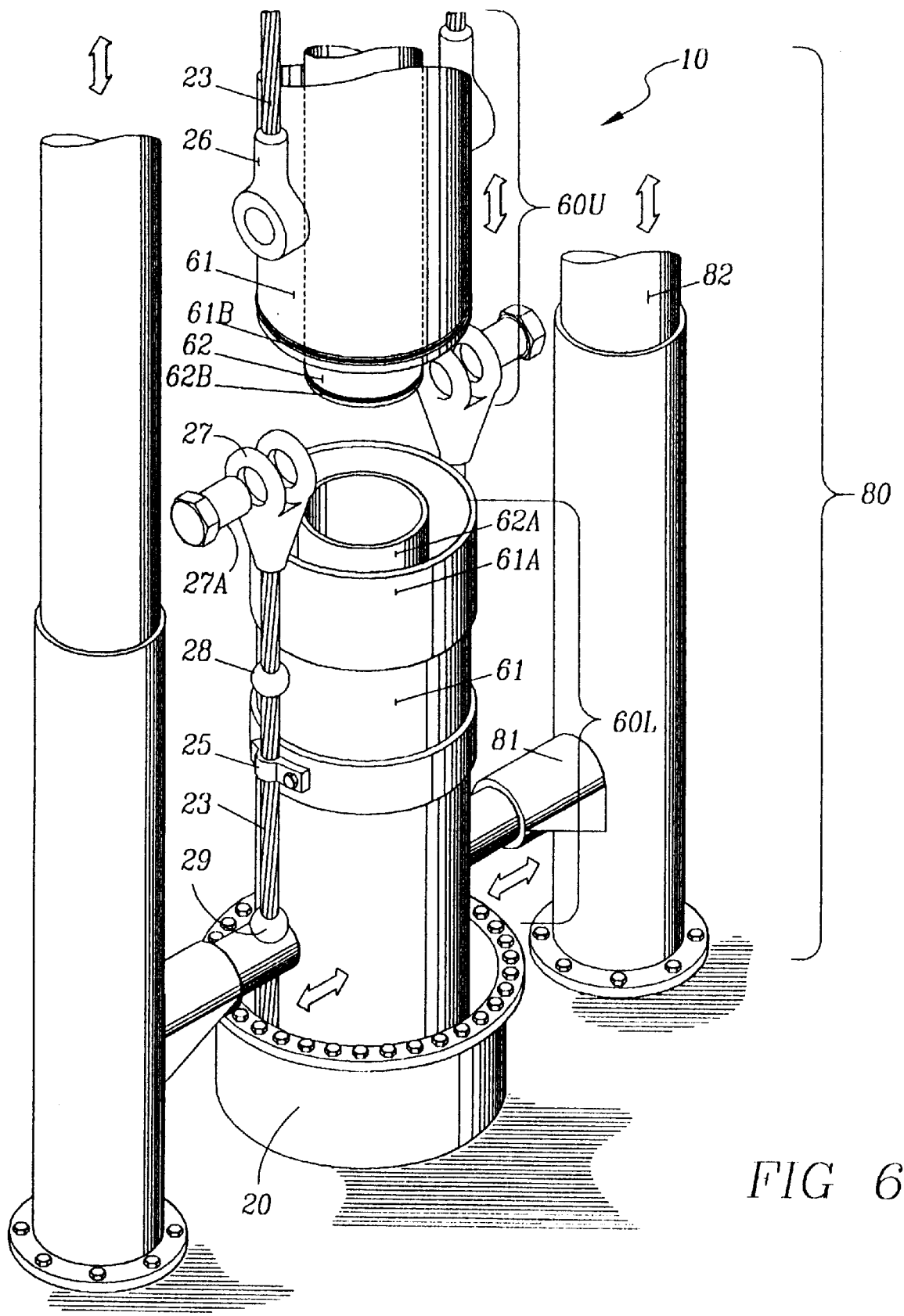
FIG. 6 is a perspective drawing of a transition assembly being installed or removed.

In FIG. 6 an upper transition module 60U is being coupled or decoupled from a lower transition module 60L. In this particular embodiment, each transition module 60U, 60L has an outer pipe 61 and an inner pipe 62. The outer pipes 61 are coupled through slip fit coupling 61A, and the inner pipes 62 are coupled through slip fit coupling 62A. In addition, ring seals 61B and 62B are used to seal pipes 61 and 62 respectively. Still further, optional guiding ribs or spokes (not shown) may be advantageously deployed in the various annular spaces, such as between pipes 61 and 62, and between pipe 61 and channel lining 20. Of course, as noted above, the couplings depicted in FIG. 6 are exemplary only, and other types of couplings and connecting strategies are contemplated as well.

Turning to the cabling, cable 23 comprises upper cable terminal 27, lifting point 28, resting point 29 and lower cable terminal 26. Connecting pins 27A are used to secure the coupling between adjacent cables 23, and cable clamps 25 are used to couple the cables 23 to the modules 60. It should be appreciated that while each cable is only as long as the module 60 in this particular embodiment, each cable can be longer or shorter than a corresponding module, and a single cable may run the entire length of the system 10. It should also be appreciated that the cable clamps 25 depicted are different in design from the cable clamps 22 of FIGS. 2 and 3, and that other types of cable clamping or arresting means are contemplated as well.

Lifting assembly 80 can be used to assemble or disassemble system 10. There are many possible configurations here, including the assembly 80 shown comprising telescoping support 82 and rams 81.

Figure 7:
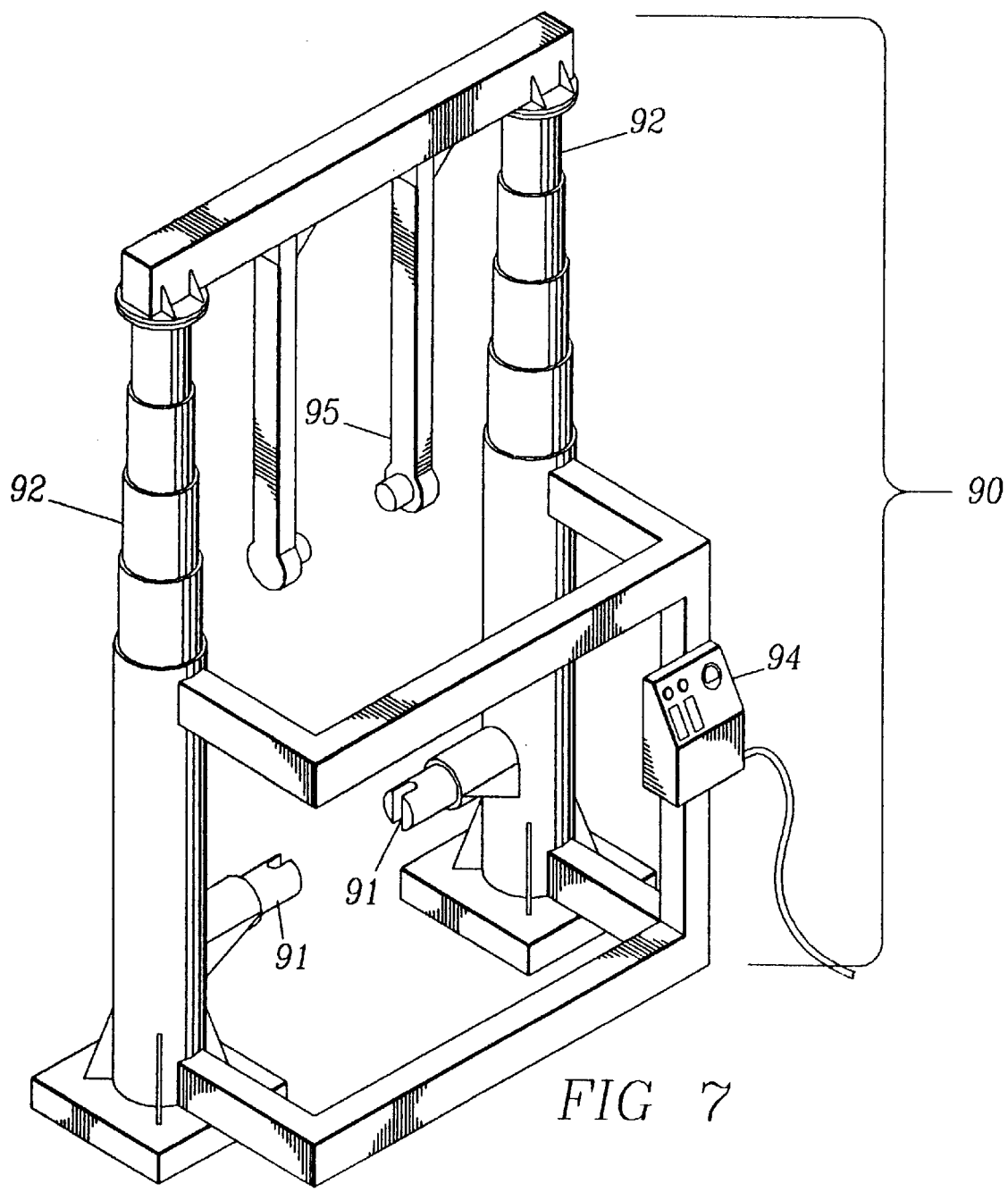
FIG. 7 is a perspective drawing of a portable lifting tool.

FIG. 7 depicts a portable mechanical lifting assembly 90 including a telescoping support 92 and rams 91. Also depicted is a lifting harness 95, which is employed to pin upper cable terminal 27 and raise or lower any of modules 60, 50 or 40. Lifting assembly 90 can be controlled by any convenient controller, including transportable control panel 94.

Figure 8A:
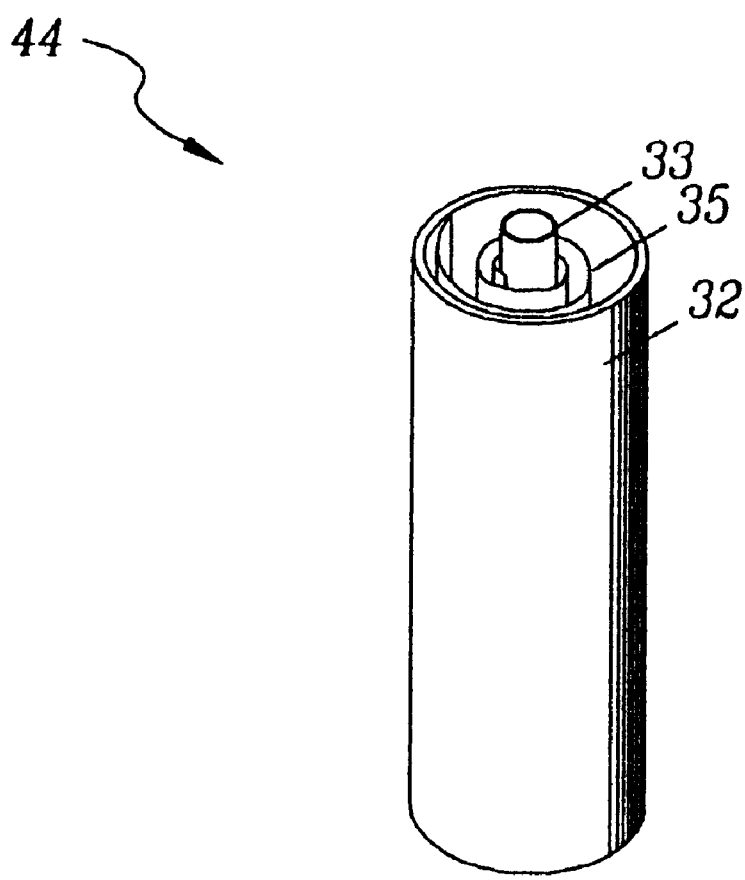
FIG. 8A is a schematic of a wrapped filter subassembly.
Figure 8B:
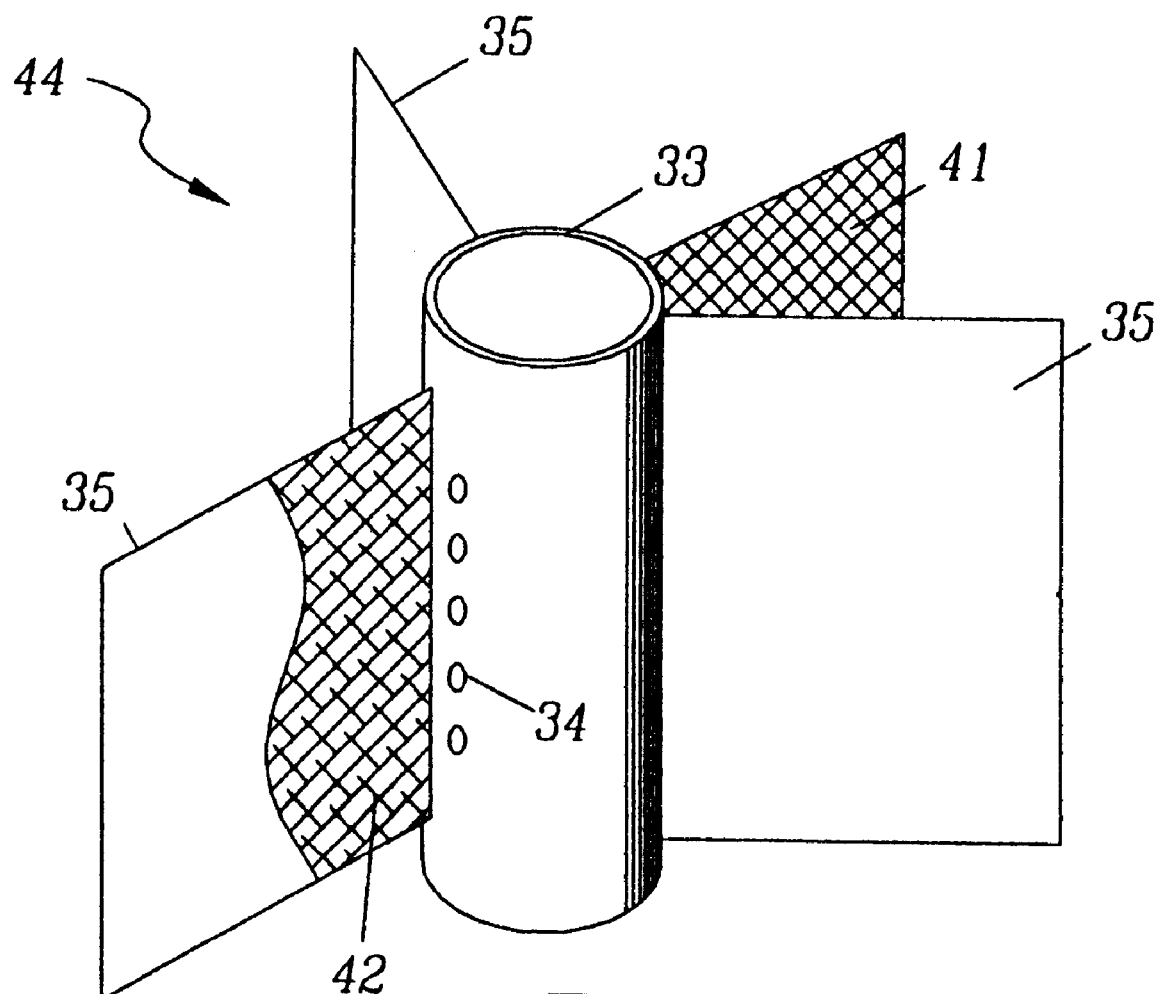
FIG. 8B is a schematic of an unwrapped filter subassembly.

In the preferred embodiments of FIGS. 8A and 8B, two or more discrete filters are folded and glued into filter leaves 35, and spirally wrapped about collector tube 33, along with interspacing spacers 41. This design produces high pressure sides and low pressure sides of the filter leaves 35. It should be appreciated that it is not necessary to have more than one filter leave 35 disposed about collector tube 33, and it is not necessary for the disposition to comprise wrapping. In alternative embodiments, for example, it is contemplated that the filter leave(s) could be partially wrapped and/or partially folded about collector tube 33.

Figure 8C:
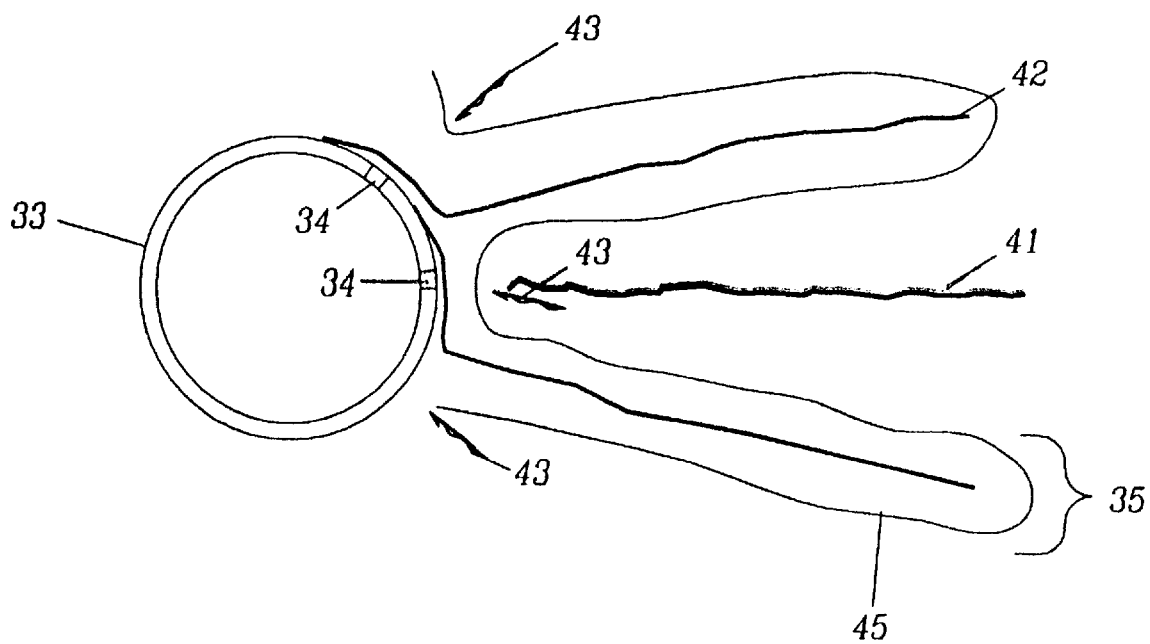
FIG. 8C is a more detailed schematic of a portion of the unwrapped filter subassembly of FIG. 8B.
Figure 8D:
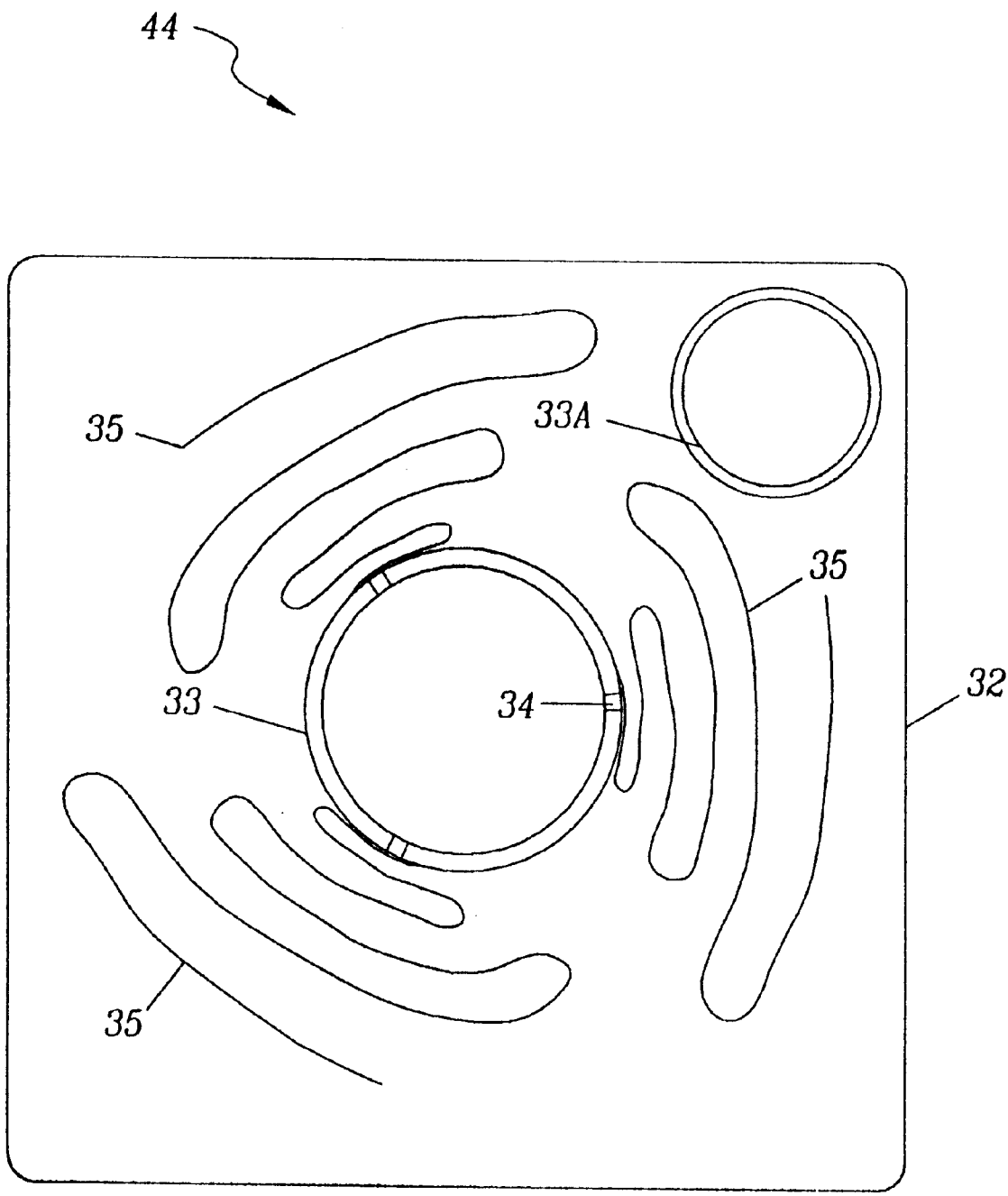
FIG. 8D is a schematic of an alternative filter subassembly in which the filter material is depicted in a folded configuration.
Figure 8E:
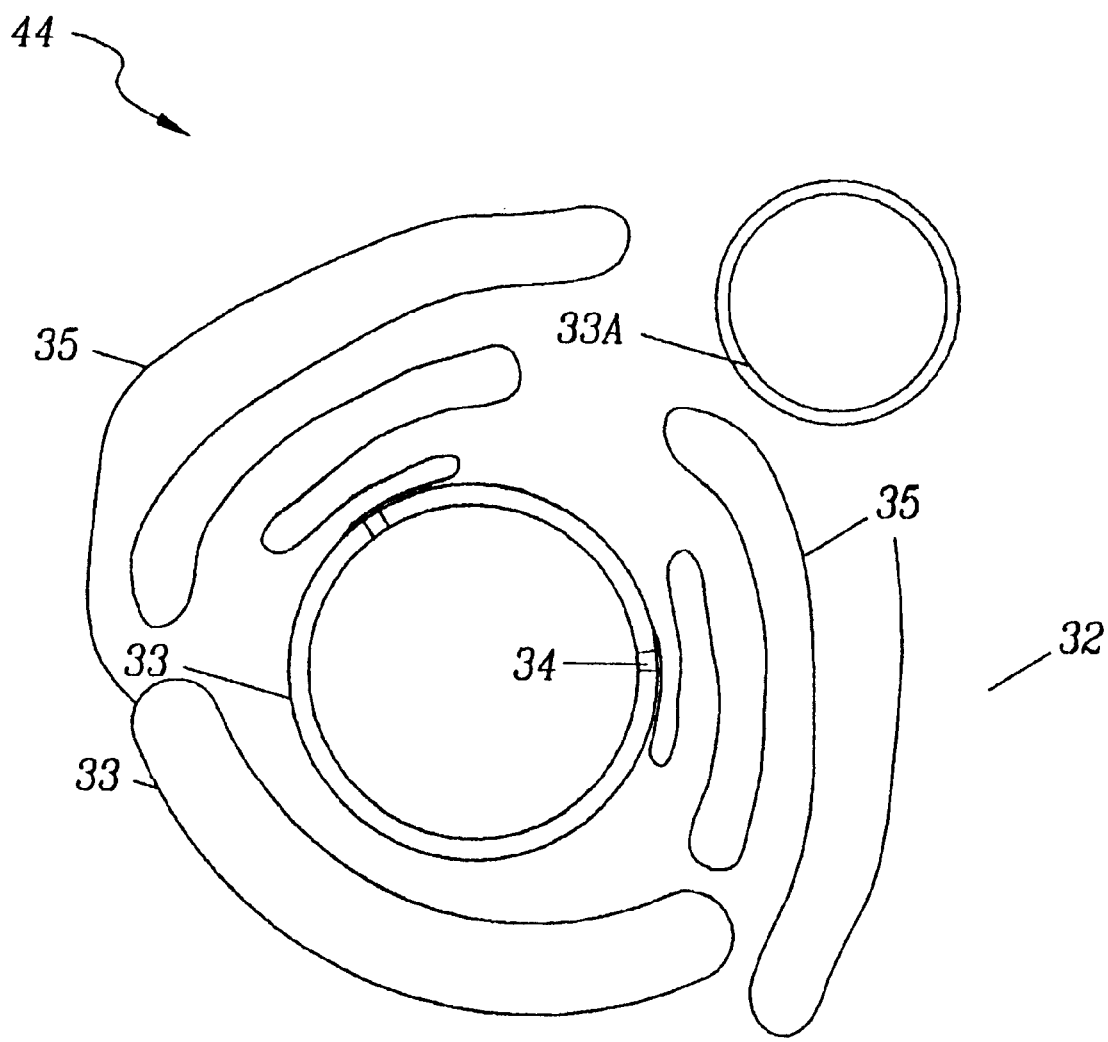
FIG. 8E is a schematic of another alternative filter subassembly.

Additional details of preferred embodiments of filter 35 are depicted in FIG. 8C. Here, each of the filter leaves 35 comprises a layer of filter material 45 on each side of a permeate carrier material 42. The permeate carrier material 42 is sealed at seal 43 and drains into collector holes 34 provided in the collector tubes 33. As noted above, a spacer 41 is disposed between overlapping filter leaves 35. Feed liquid not passing through the filter leaves 35 would continue to flush the high pressure side of the leaves 35, and would eventually be carried out of the system via flushing flowpath 19.

The filter material 45 contemplated herein includes, but is not limited to membranes used in reverse osmosis processes. Thus, the inventive subject matter herein may employ materials designed to filter macro particles (100 to 1000 Micrometers), micro particles (1.0 to 100 Micrometers), macro molecular particles (0.1 to 1.0 Micrometers), molecular particles (0.001 to 0.1 Micrometers) or ionic particles (less than 0.001 to 0.001 micrometers). Future filter developments may increase the range of filtration even further to include even smaller particles, and perhaps even molecular lysis, such as separating hydrogen from oxygen as in hydrolysis. In this manner the contemplated processes would cover the entire filtration spectrum for liquids. The filtration spectrum identified above would include particle filtration, and continue through Microfiltration, Ultrafiltration, Nanofiltration and Hyperfiltration (Reverse Osmosis).

It is contemplated that a single outer shell 31 could contain multiple filter casings 32. In such an embodiment multiple collectors 33 can be employed while still maintaining efficient use of the space inside filter casing 32, and such an embodiment satisfies the limitation that in at least some level within the apparatus at least 30% of the permeate produced is collected within single filter subassemblies 30 at any given level. In other preferred embodiments 40%, 60% and up to substantially all of the permeate produced is collected from within single filter subassemblies 30 suspended at any given depth.

In much less preferred embodiments it would also be possible to provide multiple filter subassemblies 30 at a given depth. But for purposes of this application the 30% limitation has been chosen to distinguish and provide a significant advantage over Chenoweth. In Chenoweth there are always five distinct membrane assemblies at each production level. That choice was obviously made to efficiently accommodate multiple conventional membrane assembly clusters, at a given depth, within a round well hole. While Chenoweth neither taught nor suggested the improvement, it would also be possible to provide only three distinct membrane assemblies at each production depth. Such a cluster would produce approximately a third of the permeate at a given depth within each of the three filter casings, and for this reason the 30% limitation has been chosen.

Turning to still further alternatives, it is contemplated that a permeate collector tube 33A could be positioned in other than a central position (as in FIGS. 8D and 8E), or that the collector could be positioned completely outside the filter subassembly. For example, one or more collectors (not shown) could be positioned inside the production assembly 40, and permeate could flow from the collector(s) into an external section comprising a new annulus (not shown). Again the critical limitation is that in at least some level within the apparatus more than a 30% of the permeate produced at a given depth is collected within single filter subassembly 30.

Of course, the invention is not limited to the embodiments expressly shown and described. In alternative embodiments, for example, any of the liquid flows could operate in reverse to that described herein. Alternatively, the various fluid flowpaths could be interchanged. Thus, in FIG. 2 flushing fluid could exit ports 74 rather than feed fluid entering ports 74. In other alternative embodiments, the system and methods described herein could be used to purify foods such as orange juice, or to separate out various industrial chemicals. Thus, while specific embodiments and applications have been shown and described, it would be apparent to those skilled in the art that many more modifications are possible without departing from the inventive concepts herein. The invention, therefore, is not to be restricted except in the spirit of the appended claims.

What is claimed is:

1. A method of purifying a fluid comprising:

disposing the fluid in a passageway;

providing a plurality of filter casings in the passageway, each having a filter and a collector operatively coupled to employ a head pressure as a substantial force in driving at least a portion of the fluid through the filter to produce a permeate;

providing a common permeate conduit which conducts the permeate produced within at least two of the filter casings, and about which the filters are circumferentially disposed; and disposing the casings about the common permeate conduit such that at least 30% of the permeate produced at a given depth is produced within a single one of the filter casings.

2. The method of claim 1 wherein the step of disposing the fluid comprises disposing the fluid in a channel.

3. The method of claim 1 wherein the channel has a depth of at least 50 meters.

4. The method of claim 1 wherein the channel has a depth of at least 250 meters.

5. The method of claim 1 wherein the step of providing a filter comprises providing a semi-permeable membrane.

6. The method of claim 1 wherein at least 40% of the permeate produced at said depth is produced within the single one of the filter casings.

7. The method of claim 1 wherein at least 60% of the permeate produced at said depth is produced within the single one of the filter casings.

8. The method of claim 1 wherein substantially all of the filter at the given depth is produced within the single one of the filter casings.

9. The method of claim 1 filter comprising:

disposing multiple said filters in at least two stacked production modules having a first transport zone for transporting the permeate, a second transport zone for transporting a feed portion of the fluid, and a third transport zone for transporting a flushing portion of the fluid.

10. The method of claim 9 further comprising providing the at least two production modules with a slip fit connection.

11. The method of claim 9 flier comprising maintaining the production modules in mating relationship through connections to supporting cables or rods.

12. The method of claim 1 further comprising:

utilizing a submerged pump to raise the permeate towards the surface.

13. The method of claim 12 wherein the pump operates at least partially using an air lift principle.

14. The method of claim 13 further comprising electrolyzing the fluid to produce a gas.

15. The method of claim 1 filter comprising drawing the fluid from a water source using a pipe having removable inlet plugs.

16. The method of claim 14 filter comprising laying the pipes using an underwater sled which digs a trench while concurrently laying a pipe.

17. The method of claim 1 wherein:

the step of disposing the fluid comprises disposing the fluid in a channel having a depth of at least 250 meters;

wherein the step of providing a filter comprises providing a semi-permeable membrane; and at least 40% of the permeate produced at said depth is produced within a single one of the filter casings.

18. The method of claim 1 wherein:

the step of disposing the fluid comprises disposing the fluid in a channel having a depth of at least 250 meters; and the step of providing a filter comprises providing a semi-permeable membrane; and further comprising disposing multiple said filters in at least two stacked production modules.

19. The method of claim 1 wherein the step of disposing the fluid comprises disposing the fluid in a channel having a depth of at least 50 meters and the step of providing a filter comprises providing a semi-permeable membrane; and further comprising disposing multiple said filters in at least two stacked production modules, and maintaining the production modules in mating relationship through connections to supporting cables or rods.

* * * * *